(12) United States Patent
Lee

(10) Patent No.: US 12,731,165 B2
(45) Date of Patent: Sep. 8, 2026

(54) METHOD AND SYSTEM FOR DISPLAYING SPONSORED CONTENT IN USER PROFILE AREA

(71) Applicant: LINE Plus Corporation, Seongnam-si (KR)

(72) Inventor: Yunji Lee, Seongnam-si (KR)

(73) Assignee: LINE PLUS CORPORATION, Gyeonggi-do (KR)

( * ) Notice: Subject to any disclaimer, the term of this patent is extended or adjusted under 35 U.S.C. 154(b) by 0 days.

(21) Appl. No.: 19/062,590

(22) Filed: Feb. 25, 2025

(65) Prior Publication Data

US 2025/0191019 A1 Jun. 12, 2025

Related U.S. Application Data

(63) Continuation of application No. PCT/KR2023/011670, filed on Aug. 8, 2023.

(30) Foreign Application Priority Data

Aug. 25, 2022 (KR) ........................ 10-2022-0106628

(51) Int. Cl.
*G06Q 30/02* (2023.01)
*G06Q 30/0214* (2023.01)
(Continued)

(52) U.S. Cl.
CPC ..... *G06Q 30/0214* (2013.01); *G06Q 30/0252* (2013.01); *G06Q 30/0277* (2013.01)

(58) Field of Classification Search
CPC ........... G06Q 30/0214; G06Q 30/0252; G06Q 30/02; G06Q 50/10; G06Q 50/50;
(Continued)

(56) References Cited

U.S. PATENT DOCUMENTS

2008/0148311 A1* 6/2008 Tischer ................ H04H 20/103
725/32
2009/0055263 A1* 2/2009 Okubo ............... G06Q 30/0273
705/14.69
(Continued)

FOREIGN PATENT DOCUMENTS

KR 2000-0064181 A * 11/2000
KR 2001-0095848 A * 11/2001
(Continued)

OTHER PUBLICATIONS

International Search Report dated Nov. 13, 2023 issued in International Patent Application No. PCT/KR2023/011670.
(Continued)

*Primary Examiner* — Thuy N Nguyen
(74) *Attorney, Agent, or Firm* — Harness, Dickey & Pierce, P.L.C.

(57) ABSTRACT

Provided is a method for displaying sponsored content in a profile area of a user displayed in a chat room in which the user is participating. The method may be executed by at least one processor of a user terminal. The method may include receiving a first input for selecting whether to display sponsored content on a profile area, displaying the sponsored content in the profile area based on the first input, and displaying reward information according to displaying of the sponsored content.

17 Claims, 10 Drawing Sheets

(51) Int. Cl.
*G06Q 30/0241* (2023.01)
*G06Q 30/0251* (2023.01)

(58) Field of Classification Search
CPC ....... G06Q 30/0267; G06Q 30/0207–30/0277; G06F 3/0484; G06N 20/00; G06T 19/00; G06T 19/006; H04L 51/04; H04L 51/07
See application file for complete search history.

(56) References Cited

U.S. PATENT DOCUMENTS

| | | | | |
|---|---|---|---|---|
| 2009/0063283 | A1* | 3/2009 | Kusumoto | G06Q 30/02 705/14.25 |
| 2009/0292595 | A1* | 11/2009 | Tonnison | G06Q 50/01 707/999.005 |
| 2011/0112911 | A1* | 5/2011 | Birnholz | G06Q 30/0245 705/14.69 |
| 2013/0197982 | A1* | 8/2013 | Watfa | G06Q 30/0241 705/14.12 |
| 2013/0304591 | A1* | 11/2013 | Murray | G06Q 30/0279 705/16 |
| 2015/0067505 | A1* | 3/2015 | Metcalf | G06F 16/958 707/751 |
| 2015/0206352 | A1* | 7/2015 | Murakami | G06T 19/006 345/633 |
| 2016/0267520 | A1* | 9/2016 | Kalish | G06Q 30/0272 |
| 2017/0364955 | A1* | 12/2017 | Chung | G06Q 30/0207 |
| 2019/0303962 | A1* | 10/2019 | Joutras | G06Q 30/0214 |
| 2019/0339834 | A1* | 11/2019 | Weiner | G06F 40/14 |
| 2021/0256739 | A1* | 8/2021 | Franklin | G06Q 30/0241 |

FOREIGN PATENT DOCUMENTS

| | | | | |
|---|---|---|---|---|
| KR | 2002-0026966 | A | * | 4/2002 |
| KR | 2002-0074247 | A | * | 9/2002 |
| KR | 10-2008-0035270 | A | | 4/2008 |
| KR | 10-2015-0032415 | A | | 3/2015 |
| KR | 10-2015-0071757 | A | | 6/2015 |
| KR | 2015-0071757 | A | * | 6/2015 |
| KR | 10-2016-0097604 | A | | 8/2016 |
| KR | 2017-0098485 | A | * | 10/2017 |
| KR | 10-2018-0033849 | A | | 4/2018 |
| KR | 2019-0110194 | A | * | 9/2019 |
| KR | 20210029657 | A | | 3/2021 |

OTHER PUBLICATIONS

Korean Office Action for corresponding Korean Application No. 10-2022-0106628 dated Jun. 13, 2026.

* cited by examiner

METHOD AND SYSTEM FOR DISPLAYING SPONSORED CONTENT IN USER PROFILE AREA

CROSS-REFERENCE TO RELATED APPLICATION

This application is a continuation of and claims the benefit of priority under 35 U.S.C. §§ 120 and 365 (c) from International Application No. PCT/KR2023/011670 filed on Aug. 8, 2023, which claims priority to Korean Patent Application No. 10-2022-0106628 filed on Aug. 25, 2022, the entire contents of each of which are herein incorporated by reference.

BACKGROUND

Field

The present disclosure relates to methods and systems for displaying sponsored content on a profile area of a user, and specifically, to methods and devices for displaying sponsored content on a profile area of a user displayed in a chat room in which the user is participating.

Description of Related Art

With the proliferation of mobile devices such as smartphones and the development of the Internet, the use of instant messaging applications that enable not only one-on-one conversations but also conversations among multiple users via mobile devices has become widespread. In addition, the demand for so-called "app tech," a new method of financial technology that accumulates cash equivalents using reward applications on mobile devices, is increasing rapidly.

Meanwhile, sponsored content (e.g., advertising content) displayed in the related instant messaging applications can only be displayed in a limited area within a range that does not interfere with the unique functionality of the messaging applications. In addition, there is a problem in providing customized content due to difficulty in collecting user information.

SUMMARY

In order to solve one or more problems (e.g., the problems described above and/or other problems not explicitly described herein), some example embodiments of the present disclosure provide methods for, non-transitory computer-readable recording mediums storing instructions for, and/or systems (apparatuses) for displaying sponsored content.

Example embodiments of the present disclosure may be implemented in various ways, including methods, systems (apparatus), or computer-readable non-transitory recording mediums for storing instructions.

A method for displaying sponsored content on a profile area of a user displayed in a chat room, in which the user is participating, may be provided. The method may be executed by one or more processors of a user terminal and may include receiving a first input of selecting whether to display the sponsored content on the profile area, displaying the sponsored content in the profile area based on the first input, and displaying reward information according to the display of the sponsored content.

The method may further include receiving a second input of selecting a display frequency of sponsored content, in which the displaying the sponsored content in the profile area may include displaying the sponsored content in the profile area based on the second input.

The method may further include receiving a third input of selecting a category of sponsored content, in which the displaying the sponsored content in the profile area may include displaying the sponsored content in the profile area based on the third input.

The displaying the sponsored content in the profile area may include displaying the sponsored content in the profile area based on information associated with the user.

The displaying the sponsored content in the profile area may include displaying the sponsored content in the profile area based on information associated with another participant in the chat room.

The displaying the sponsored content in the profile area may include displaying the sponsored content in the profile area based on chat content in the chat room.

The method may further include calculating a plurality of expected levels of interest corresponding to the plurality of sponsored candidates, respectively, using a machine learning model configured based on at least one of chat content or personal information, in which the displaying the sponsored content in the profile area includes displaying, among the plurality of sponsored content candidates, a sponsored content candidate with a highest expected level of interest in the profile area as the sponsored content.

The displaying the sponsored content in the profile area may include displaying the sponsored content in combination with the profile image of the user through an augmented reality technique.

The displaying the sponsored content in the profile area may include displaying the sponsored content together with the profile image of the user, and a layer displaying the sponsored content may correspond to an upper layer compared to a layer displaying the profile image of the user.

The displaying the sponsored content in the profile area may include displaying the sponsored content in place of the profile image of the user.

The method may further include receiving a fourth input of selecting a display type of sponsored content, in which the displaying the sponsored content in the profile area may include displaying the sponsored content in the profile area based on the fourth input.

The displaying the sponsored content in the profile area may further include displaying, in the profile area, information associated with a target product of the sponsored content.

The method may further include displaying a link associated with the sponsored content in the profile area, and in response to clicking the link, displaying a purchase page of a target product of the sponsored content.

The method may further include displaying an image associated with the sponsored content in the profile area, and in response to clicking on an image associated with the sponsored content, displaying a purchase page of a target product of the sponsored content.

The chat room may include a first chat room and a second chat room different from the first chat room, and the displaying the sponsored content in the profile area may include displaying different sponsored content in the profile area according to the chat room, in which the user is participating, being the first chat room or the second chat room.

The method may further include receiving a fifth input for replacing the sponsored content, and displaying, based on the fifth input, sponsored content different from the sponsored content in the profile area in place of the sponsored content.

The method may further include calculating the reward information based on a display frequency of the sponsored content on the profile area.

The method may further include calculating the reward information based on a total number of exposures of the sponsored content on the profile area or a total number of clicks on the sponsored content associated with the profile area.

A computer-readable non-transitory recording medium storing instructions that, when executed by one or more processors, cause a user terminal to the method described above is provided.

An information processing system may a memory and one or more processors connected to the memory and configured to execute one or more computer-readable programs included in the memory, in which the one or more programs include instructions for receiving a first input of selecting whether to display sponsored content on a profile area of a user displayed in a chat room in which a user is participating, displaying the sponsored content in the profile area based on the first input, and displaying reward information according to the display of the sponsored content.

In various aspects of the present disclosure, by displaying the sponsored content on the profile area, the limitations of the display space of the user terminal can be overcome.

In various aspects, by displaying user-customized sponsored content on the profile area, various content can be provided efficiently.

In various aspects, by paying rewards to the user, the computing resources of the messaging application can be utilized for various purposes.

The effects of the present disclosure are not limited to the effects described above, and other effects not described herein can be clearly understood by those of ordinary skill in the art (hereinafter referred to as “ordinary technician”) from the description of the claims.

BRIEF DESCRIPTION OF THE DRAWINGS

Some example embodiments of the present disclosure will be described with reference to the accompanying drawings described below, where similar reference numerals indicate similar elements, although the aspects are not limited thereto, in which.

DETAILED DESCRIPTION

Figure 1:
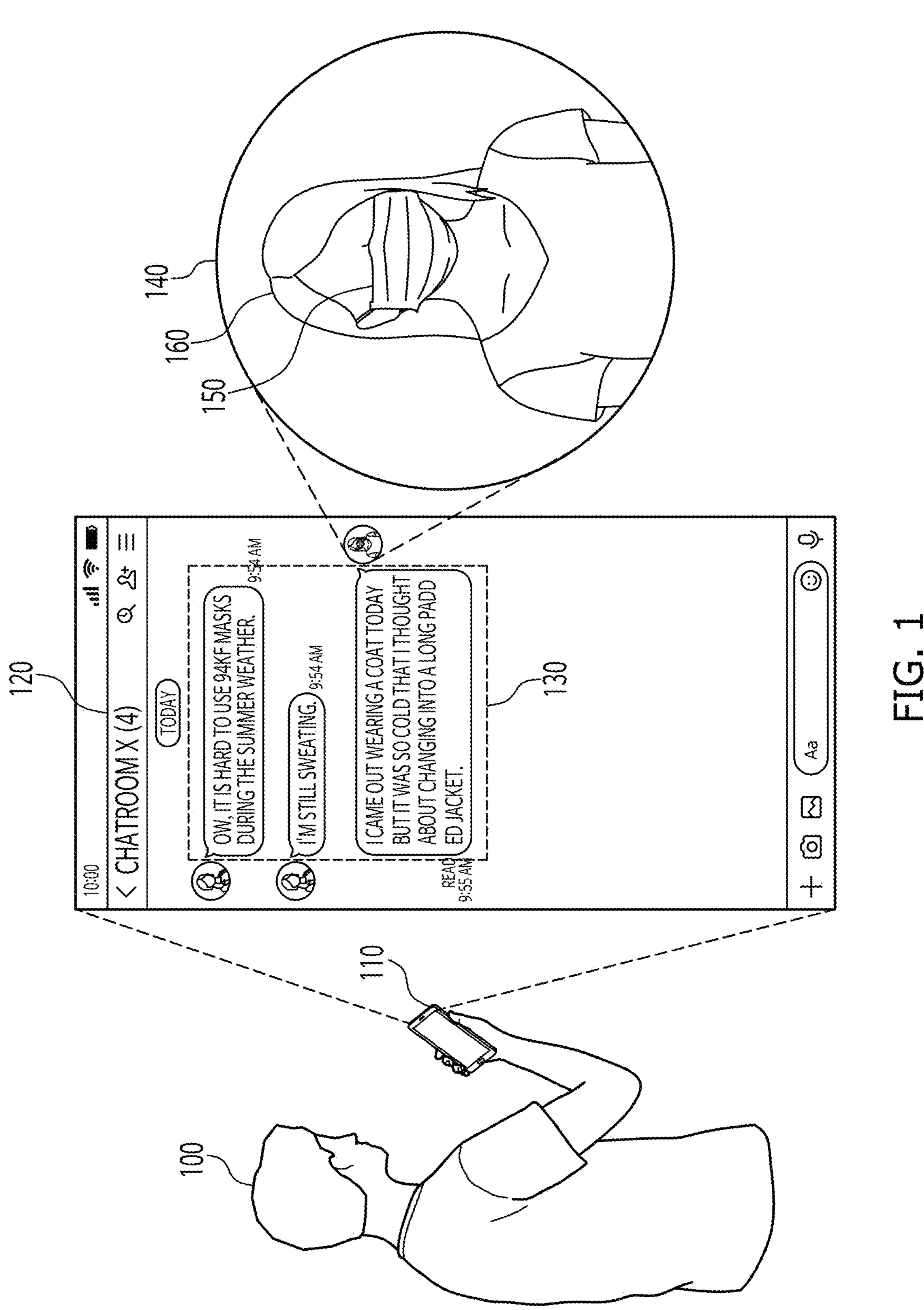
FIG. 1 is a diagram illustrating an example of displaying sponsored content on a profile area of a user displayed in a chat room, according to an example embodiment.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are given the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to some examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

The singular forms “a,” “an,” and “the” as used herein are intended to include the plural forms as well, unless the context clearly indicates the singular forms. Further, the plural forms are intended to include the singular forms as well, unless the context clearly indicates the plural forms. Further, throughout the description, when a portion is stated as “comprising (including)” a component, it is intended to mean that the portion may additionally comprise (or include or have) another component, rather than excluding the same, unless specified to the contrary.

As used herein, expressions such as “one of,” “any one of,” and “at least one of,” when preceding a list of elements, modify the entire list of elements and do not modify the individual elements of the list. Thus, for example, both “at least one of A, B, or C” and “at least one of A, B, and C”

mean either A, B, C or any combination thereof. Likewise, A and/or B means A, B, or A and B.

Further, the term "module" or "unit" as used herein refers to a software or hardware component, and the "module" or the "unit" performs certain roles. However, the meaning of the "module" or "unit" is not limited to software or hardware. The "module" or "unit" may be configured to be in an addressable storage medium or configured to execute one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, or variables. Functions provided in the components and the "modules" or "units" may be combined into a smaller number of components and "modules" or "units", or further divided into additional components and "modules" or "units."

The "module" or "unit" may be implemented as a processor and/or a memory. The "processor" should be interpreted broadly to encompass a general-purpose processor, a central processing unit (CPU), a microprocessor, a digital signal processor (DSP), a controller, a microcontroller, a state machine, etc. Under some circumstances, the "processor" may refer to an application-specific integrated circuit (ASIC), a programmable logic device (PLD), a field-programmable gate array (FPGA), etc. The "processor" may refer to a combination of processing devices, for example, a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. The memory is said to be in electronic communication with a processor if the processor can read information from and/or write information to the memory. The memory integrated with the processor is in electronic communication with the processor.

In the present disclosure, a "user" may refer to a user or a user account using an instant messaging service application, etc. The user account may refer to an account or related data generated and used by the user in the instant messaging service application, etc.

In this disclosure, a "chat room" may refer to a virtual space or group in which one or more users (or user accounts) are participating, which may be generated in the instant messaging application, etc. installed on a computing device. For example, one or more user accounts may participate or be included in the chat room and exchange various types of messages, files, etc. In addition, in the chat room, a Voice over Internet Protocol (VOIP) voice call function, a VoIP video call function, a live broadcast function (VOIP real-time video transmission function), and a multimedia content generation function may be provided, enabling voice calls, video calls, video streaming, multimedia content transmission, etc. between user accounts.

In this disclosure, a "profile area" may refer to a virtual area or space in which the user (or user account) may post a profile image of the user in the instant messaging application, etc. In addition, it may refer to a virtual area or space where other participants of the chat room, in which the user of the instant messaging application is participating, may view or check the profile image of the user. For example, if the user posts a profile image in the profile area, other users or other participants, etc. may check the posted profile image of the user in the profile area of the user. The profile image may refer to one or more photographs or videos.

In the present disclosure, "chat content" may refer to messages exchanged by users within the chat room of the instant messaging application, such as text messages, image messages, video messages, and/or emoticon/sticker messages.

In the present disclosure, "sponsored content" may refer to an information medium such as text, image, voice, video, etc. provided and used by other users, companies, etc., or a combination of two or more of these information media. For example, the "sponsored content" may include content for the promotion of a specific product or service.

In the present disclosure, a "target product" of the sponsored content may refer to a product, a service, or an object related to the provision of a service, etc., which are intended to be promoted or advertised through the sponsored content.

FIG. 1 is a diagram illustrating an example in which sponsored content 150 is displayed on a profile area 140 of a user 100 that is displayed in a chat room 120 of an instant messaging application executed on a user terminal 110. The user 100 participating in the chat room 120 may exchange messages with other users in the chat room 120 through the instant messaging application operating on the user terminal 110. The chat room 120 may correspond to various types of chat rooms such as a one-on-one chat room, a group chat room, an open chat room, etc.

The user 100 may exchange chat content 130 in the chat room 120. In this case, the profile area 140 of the user 100 may be displayed together with the chat content 130. Although FIG. 1 illustrates that the profile area 140 is circular, aspects are not limited thereto and it may be displayed in any form.

In the chat content 130, for each message transmitted by each chat room participant, the profile area of the corresponding participant may be displayed on the side of each message. That is, the profile area 140 may refer to a plurality of areas. For example, the profile area 140 of the user may be displayed to the right of the message transmitted by the user 100, and the profile areas of the other participants in the chat room 120 may be displayed to the left of the messages transmitted by each participant, but aspects are not limited to this method. In another aspect, on the user terminal 110, the display of the profile area 140 of the user 100 may be omitted, and the profile area of the user may be displayed on the terminal of each participant (other than the user 100) in the chat room 120.

The sponsored content 150 and/or a profile image 160 of the user may be displayed in the profile area 140. The sponsored content 150 may be displayed based on an input from the user 100 selecting whether to display the sponsored content on the profile area 140. For example, the sponsored content 150 may be displayed on the profile area 140 only if the user allows the display of the sponsored content.

The sponsored content 150 may be selected based on various information and displayed on the profile area 140. For example, the sponsored content 150 may be selected based on at least one of information associated with the user, information associated with other participants in the chat room, chat content, and/or expected level of interest of the user. This will be described in detail below with reference to FIG. 4.

The sponsored content 150 may be displayed on the profile area 140 in various ways. The sponsored content 150 may be displayed in combination with the profile image 160 of the user 100 through an augmented reality technique. For example, if the sponsored content 150 is an image associated with a face mask, the sponsored content 150 may be combined with the profile image 160 of the user 100 and displayed as if the user 100 is wearing the mask, as illustrated in FIG. 1. The various ways in which the sponsored content 150 is displayed will be described in detail below with reference to FIG. 6.

Figure 2:
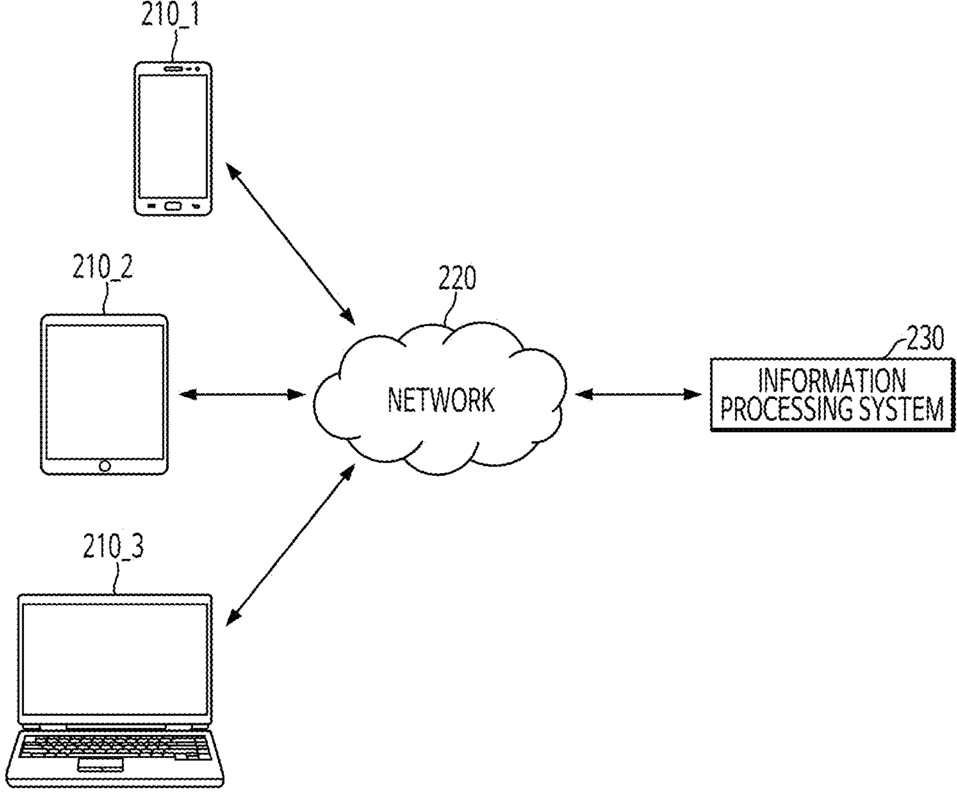
FIG. 2 is a schematic diagram illustrating a configuration in which an information processing system is communicatively connected to a plurality of user terminals to provide sponsored content display service, according to an example embodiment.

FIG. 2 is a schematic diagram illustrating a configuration in which an information processing system 230 is communicatively connected to a plurality of user terminals 210_1, 210_2, and 210_3 to provide a sponsored content display service. The information processing system 230 may include a system(s) capable of providing an instant messaging service, a system(s) capable of providing a social network service, and/or a system(s) capable of providing a sponsored content display service. The information processing system 230 may include one or more server devices and/or databases, or one or more distributed computing devices and/or distributed databases based on cloud computing services capable of storing, providing, and executing computer-executable programs (e.g., downloadable applications) and data associated with the instant messaging service, the social network service and/or the sponsored content display service. For example, the information processing system 230 may include separate systems (e.g., servers) for the instant messaging service, the social network service, and/or the sponsored content display service.

The instant messaging service, the sponsored content display service, etc. provided by the information processing system 230 may be provided to the user through the instant messaging application, etc. installed in each of the plurality of user terminals 210_1, 210_2, and 210_3. For example, the instant messaging service may include a text messaging service, a voice messaging service, a video call service, a voice call service, a video streaming service, a social network service, a sponsored content display service, etc. between users of the instant messaging application.

The plurality of user terminals 210_1, 210_2, and 210_3 may communicate with the information processing system 230 through the network 220. The network 220 may be configured to enable communication between the plurality of user terminals 210_1, 210_2, and 210_3 and the information processing system 230. The network 220 may be configured as a wired network such as Ethernet, a wired home network (Power Line Communication), a telephone line communication device and RS-serial communication, a wireless network such as a mobile communication network, a wireless LAN (WLAN), Wi-Fi, Bluetooth, and ZigBee, or a combination thereof, depending on the installation environment. The method of communication is not limited, and may include a communication method using a communication network (e.g., mobile communication network, wired Internet, wireless Internet, broadcasting network, satellite network, etc.) that may be included in the network 220 as well as short-range wireless communication between the user terminals 210_1, 210_2, and 210_3.

In FIG. 2, the mobile phone terminal 210_1, the tablet terminal 210_2, and the PC terminal 210_3 are illustrated as examples of the user terminal, but aspects are not limited thereto, and the user terminals 210_1, 210_2, and 210_3 may be any computing device that is capable of wired and/or wireless communication and capable of installing and executing the instant messaging application, etc. For example, the user terminal may include smartphones, mobile phones, navigation systems, computers, notebook computers, digital broadcasting terminals, personal digital assistants (PDAs), portable multimedia players (PMPs), tablet PCs, game consoles, wearable devices, Internet of things (IoT) devices, virtual reality (VR) devices, augmented reality (AR) devices, etc. In addition, FIG. 2 illustrates that three user terminals 210_1, 210_2, and 210_3 are in communication with the information processing system 230 through the network 220, but aspects are not limited thereto, and a different number of user terminals may be configured to be in communication with the information processing system 230 through the network 220.

The information processing system 230 may provide the user terminals 210_1, 210_2, and 210_3 with sponsored content for display in the user profile area. In another aspect, the user terminals 210_1, 210_2, and 210_3 may generate the sponsored content for display in the user profile area.

Figure 3:
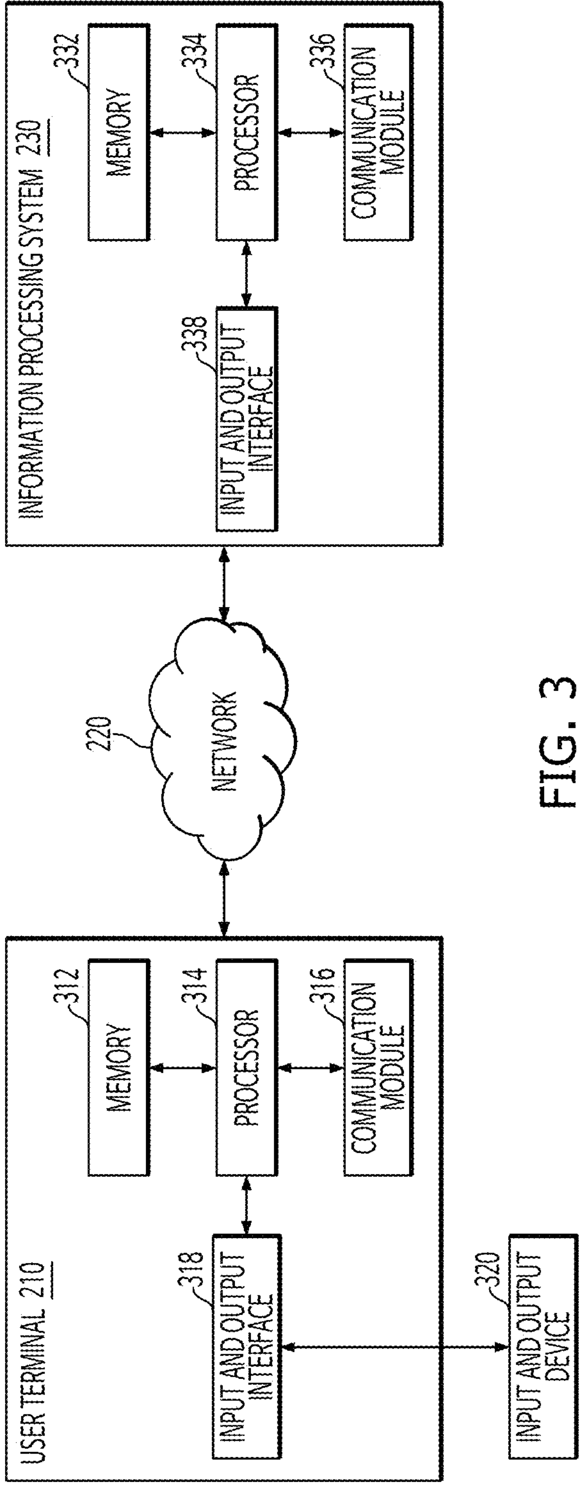
FIG. 3 is a block diagram illustrating an internal configuration of the user terminal and the information processing system, according to an example embodiment.

FIG. 3 is a block diagram of an internal configuration of the user terminal 210 and the information processing system 230. The user terminal 210 may refer to any computing device that is capable of executing the instant messaging application, etc., and also capable of wired/wireless communication, and may include the mobile phone terminal 210_1, the tablet terminal 210_2, and the PC terminal 210_3 of FIG. 2, for example. As illustrated, the user terminal 210 may include a memory 312, a processor 314, a communication module 316, and an input/output interface 318. Likewise, the information processing system 230 may include a memory 332, a processor 334, a communication module 336, and an input/output interface 338. As illustrated in FIG. 3, the user terminal 210 and the information processing system 230 may be configured to communicate information, data, etc. through the network 220 using respective communication modules 316 and 336. In addition, an input/output device 320 may be configured to input information, data, etc. to the user terminal 210, or output information, data, etc. generated from the user terminal 210 through the input/output interface 318.

The memories 312 and 332 may include any non-transitory computer-readable recording medium. The memories 312 and 332 may include a permanent mass storage device such as read only memory (ROM), disk drive, solid state drive (SSD), flash memory, etc. As another example, a non-destructive mass storage device such as ROM, SSD, flash memory, disk drive, etc. may be included in the user terminal 210 or the information processing system 230 as a separate permanent storage device that is distinct from the memory. In addition, the memories 312 and 332 may store an operating system and at least one program code (e.g., code for an application, etc. associated with the instant messaging service, the social network service, or the sponsored content display service).

These software components may be loaded from a computer-readable recording medium separate from the memories 312 and 332. Such a separate computer-readable recording medium may include a recording medium directly connectable to the user terminal 210 and the information processing system 230, and may include a computer-readable recording medium such as a floppy drive, a disk, a tape, a DVD/CD-ROM drive, a memory card, etc., for example. As another example, the software components may be loaded into the memories 312 and 332 through the communication modules 316 and 336 rather than the computer-readable recording medium. For example, at least one program may be loaded into the memories 312 and 332 based on computer programs (e.g., applications, etc. associated with the instant messaging service, the social network service, or the sponsored content display service) installed by files provided by the developers or the file distribution system that distributes the installation files of the applications through the network 220.

The processors 314 and 334 may be configured to process the commands of the computer program by performing basic arithmetic, logic, and input/output operations. The commands may be provided to the processors 314 and 334 from the memories 312 and 332 or the communication modules 316 and 336. For example, the processors 314 and 334 may be configured to execute the received commands according to a program code stored in a recording device such as the memories 312 and 332.

The communication modules 316 and 336 may provide a configuration or function for the user terminal 210 and the information processing system 230 to communicate with each other through the network 220, and may provide a configuration or function for the user terminal 210, the information processing system 230, etc. to communicate with another user terminal or another system (e.g., a separate cloud system, etc.). For example, a request or data (e.g., a request for sponsored content, etc.) generated by the processor 314 of the user terminal 210 according to a program code stored in a recording device such as the memory 312 may be transmitted to the information processing system 230 through the network 220 under the control of the communication module 316. Conversely, a control signal or command provided under the control of the processor 334 of the information processing system 230 may be sent through the communication module 336 and the network 220 and received by the user terminal 210 through the communication module 316 of the user terminal 210. For example, the user terminal 210 may receive the sponsored content from the information processing system 230.

The input/output interface 318 may be a means for interfacing with the input/output device 320. As an example, the input device may include a device such as a camera including an audio sensor and/or an image sensor, a keyboard, a microphone, a mouse, etc., and the output device may include a device such as a display, a speaker, a haptic feedback device, etc. As another example, the input/output interface 318 may be a means for interfacing with a device such as a touch screen, etc. that incorporates a configuration or function for performing inputting and outputting. While FIG. 3 illustrates that the input/output device 320 is not included in the user terminal 210, aspects are not limited thereto, and the input/output device 320 may be configured as one device with the user terminal 210. In addition, the input/output interface 338 of the information processing system 230 may be a means for interfacing with a device (not illustrated) for inputting or outputting, which may be connected to or included in the information processing system 230. While FIG. 3 illustrates the input/output interfaces 318 and 338 as the components configured separately from the processors 314 and 334, aspects are not limited thereto, and the input/output interfaces 318 and 338 may be configured to be included in the processors 314 and 334.

The user terminal 210 and the information processing system 230 may include more components than those illustrated in FIG. 3. Meanwhile, it would be unnecessary to exactly illustrate most or all of the related components. The user terminal 210 may be implemented to include at least a part of the input/output device 320 described above. In addition, the user terminal 210 may further include another component such as a transceiver, a global positioning system (GPS) module, a camera, various sensors, a database, etc. For example, if the user terminal 210 is a smartphone, it may include components generally included in the smartphone, and for example, it may be implemented such that various components such as an acceleration sensor, a gyro sensor, a microphone module, a camera module, various physical buttons, buttons using a touch panel, input/output ports, a vibrator for vibration, etc. are further included in the user terminal 210.

The processor 314 of the user terminal 210 may be configured to operate an instant messaging application or a web browser application that provides an instant messaging service including a sponsored content display service. In this case, a program code associated with that application may be loaded into the memory 312 of the user terminal 210. While the application is operating, the processor 314 of the user terminal 210 may receive information and/or data provided from the input/output device 320 through the input/output interface 318 or receive information and/or data from the information processing system 230 through the communication module 316, and process the received information and/or data and store it in the memory 312. In addition, such information and/or data may be provided to the information processing system 230 through the communication module 316.

While the instant messaging application is operating, the processor 314 may receive voice data, text, image, video, etc. input or selected through the input device such as a touch screen, a keyboard, an audio sensor and/or a camera including an image sensor, a microphone, etc., connected to the input/output interface 318, and store the received voice data, text, image, and/or video, etc. in the memory 312 or provide it to the information processing system 230 through the communication module 316 and the network 220. The processor 314 may receive a user input of selecting a graphic object displayed on the display, which is input through the input device, and provide data/request corresponding to the received user input to the information processing system 230 through the network 220 and the communication module 316.

The processor 314 of the user terminal 210 may transmit and output the information and/or data to the input/output device 320 through the input/output interface 318. For example, the processor 314 of the user terminal 210 may output the processed information and/or data through the input/output device 320 such as a device (e.g., a touch screen, a display, etc.) capable of outputting a display, a device (e.g., speaker) capable of outputting a voice, etc. The processor 314 may display the sponsored content on the display of the user terminal 210. Additionally, the processor 314 may play back the sponsored content for display on the display.

The processor 334 of the information processing system 230 may be configured to manage, process, and/or store information, data, etc. received from a plurality of user terminals 210, a plurality of external systems, etc. Information and/or data processed by the processor 334 may be provided to the user terminals 210 through the communication module 336 and the network 220. The processor 334 of the information processing system 230 may provide the sponsored content to the user terminal 210 through the communication module 336 and the network 220 according to the request for sponsored content received from the user terminal 210.

Figure 4:
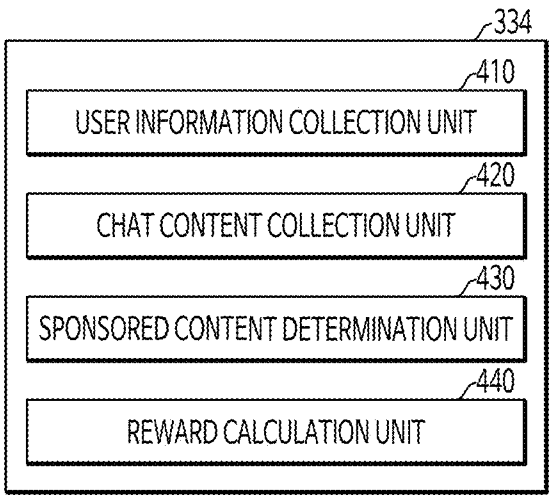
FIG. 4 is a block diagram illustrating an internal configuration of a processor of the information processing system, according to an example embodiment.

FIG. 4 is a block diagram illustrating an internal configuration of the processor 334 of the information processing system. As illustrated, the processor 334 may include a user information collection unit 410, a chat content collection unit 420, sponsored content determination unit 430, a reward calculation unit 440, etc.

The user information collection unit 410 may collect information associated with the user. For example, the user information collection unit 410 may collect the information associated with the user, such as gender, age, birthday, place of residence, location, occupation, previous product order history, previous sponsored content click history, etc. Additionally, the user information collection unit 410 may collect the information associated with a user input through the user terminal such as a first input of selecting whether to display the sponsored content on the profile area, a second input of selecting a display frequency of sponsored content, a third input of selecting a category of sponsored content, a fourth input of selecting a display type of sponsored content, a fifth input for replacing sponsored content, etc. For example, the first input may include an input of selecting whether to display sponsored content provided from an external server or a server associated with a messaging application on the profile area of the user.

The chat content collection unit 420 may collect chat content including text, images, etc. exchanged in the chat room. The chat content may be separately classified and collected for each user.

The chat content collection unit 420 may divide the text in the collected chat content into keyword or morpheme units. In this case, keywords or morphemes appearing more than a desired (or alternatively, predetermined) frequency may be separately stored as main keywords. Additionally, the chat content collection unit 420 may be configured to calculate statistical data associated with the chat content. For example, the chat content collection unit 420 may calculate the chat frequency, the number of chats, and the number of messages per period, etc. of each user in the chat room.

The sponsored content determination unit 430 may determine the sponsored content for display in the profile area of the user.

For example, the sponsored content determination unit 430 may determine the sponsored content for display in the profile area of the user based on the information associated with the user collected by the user information collection unit 410 or information associated with other participants in the chat room in which the user is participating. For example, if the user is a woman in her 20s, beauty-related content, which has a relatively high purchase rate by women in their 20s, may be determined as the sponsored content for display in the profile area of the user. In another example, if another participant is a man in his 30s, car-related content, which has a relatively high purchase rate by men in their 30s, may be determined as the sponsored content for display in the profile area of the user.

The sponsored content determination unit 430 may determine the sponsored content for display in the profile area of the user based on the chat content collected by the chat content collection unit 420. For example, if conversations associated with food take place in the chat room, chicken-related content may be determined as the sponsored content for display in the profile area of the user.

The sponsored content determination unit 430 may determine the sponsored content for display in the profile area of the user based on a sponsored profile display, a user input of selecting a display frequency of sponsored content, a user input of selecting a category of sponsored content, and/or a user input of selecting a display type of sponsored content, which will be described below with reference to FIG. 5. For example, if the user chooses to display sponsored content in a fashion category as an augmented reality type, the sponsored content that is displayable as the augmented reality type and included within the fashion category may be determined as the sponsored content for display in the profile area of the user. If there is no user input of selecting a category or display type, or if the category or display type is not specified by the user, each of the category or display type may be arbitrarily selected.

The sponsored content determination unit 430 may determine, among a plurality of sponsored content candidates, a sponsored content candidate with the highest expected level of interest as the sponsored content. The plurality of sponsored content candidates may refer to sponsored content candidates that are filtered according to the user input of selecting the category of sponsored content and/or the user input of selecting the display type of sponsored content.

The expected level of interest may refer to a probability that the user or other participants in the chat room would click on a link or image associated with the sponsored content or purchase a target product of the sponsored content. In this case, the expected level of interest may be calculated according to (or using) a machine learning model configured based on at least one of the chat content or personal information. At least one of information associated with the user, information associated with other participants in the chat room, or the chat content in the chat room may be input to the machine learning model to calculate the expected level of interest for each sponsored content candidate.

The sponsored content determination unit 430 may determine that sponsored content different from the current sponsored content is the sponsored content for display in the profile area of the user, based on the user's input for replacing sponsored content. The sponsored content determination unit 430 may determine sponsored content different from the existing sponsored content based on the user's sponsored content replacement reason. In another aspect, the sponsored content determination unit 430 may determine that the sponsored content within a category other than the category of the existing sponsored content is to be displayed in the profile area.

The reward calculation unit 440 may calculate a reward for the user according to the display of the sponsored content. That is, the reward calculation unit 440 may calculate a reward payable to the user as compensation corresponding to displaying the sponsored content in the profile area of the user. The reward may include cash equivalents, points associated with messaging applications, etc., but is not limited thereto, and may include any form of compensation.

The reward calculation unit 440 may calculate a reward based on the display frequency of sponsored content selected by the user. For example, the reward calculation unit 440 may calculate that the higher the display frequency of sponsored content selected by the user, the greater the reward payable to the user. In another aspect, the reward calculation unit 440 may calculate a reward based on the total number of exposures or the total number of clicks on the sponsored content. The total number of exposures may refer to the total number of times that the sponsored content is exposed to the other users. For example, the total number of exposures may increase proportionally as the number of participants in the chat room increases or as the number of messages of the user transmitted through the chat room increases. The total number of clicks may refer to the total number of times that the other users clicks on an image associated with the sponsored content or a link associated with the sponsored content.

Additionally or alternatively, the reward calculation unit 440 may calculate a reward based on at least one of the display frequency of sponsored content, the total number of exposures of the sponsored content, the total number of clicks, the display type of sponsored content (e.g., augmented reality), a size at which the sponsored content is displayed, the category of sponsored content (e.g., fashion), time when the sponsored content is exposed (e.g., 12:13 p.m. on January 27), duration of sponsored content exposure (e.g., 2 hours), the number of friends of the user, the number of participants in the chat room in which the user is participating, the chat frequency in the chat room, or click-through rate (CTR).

Additionally or alternatively, the reward calculation unit 440 may calculate the reward based on the chat content in the chat room. For example, the reward may be calculated based on statistical data and/or main keywords of the chat content calculated by the chat content collection unit 420. The longer the duration of the chat on a specific topic, the greater the reward that may be calculated. In another aspect, the higher the frequency of a specific main keyword included in the chat content, the greater the reward that may be calculated.

The internal configuration of the processor 334 illustrated in FIG. 4 is only an example, and in some examples, configurations other than the illustrated internal configuration may be additionally included, and/or some configurations may be omitted. For example, if some of the internal configurations described above are omitted, the processor 314 of the user terminal may be configured to perform the functions of the omitted internal configurations. In addition, although the internal configuration of the processor 334 has been divided by functions and described in FIG. 4, it does not necessarily mean that they are physically separated. The user information collection unit 410, the chat content collection unit 420, the sponsored content determination unit 430, and the reward calculation unit 440 are described as separate components, but this is intended to aid in understanding the disclosure, and aspects are not limited thereto.

Figure 5:
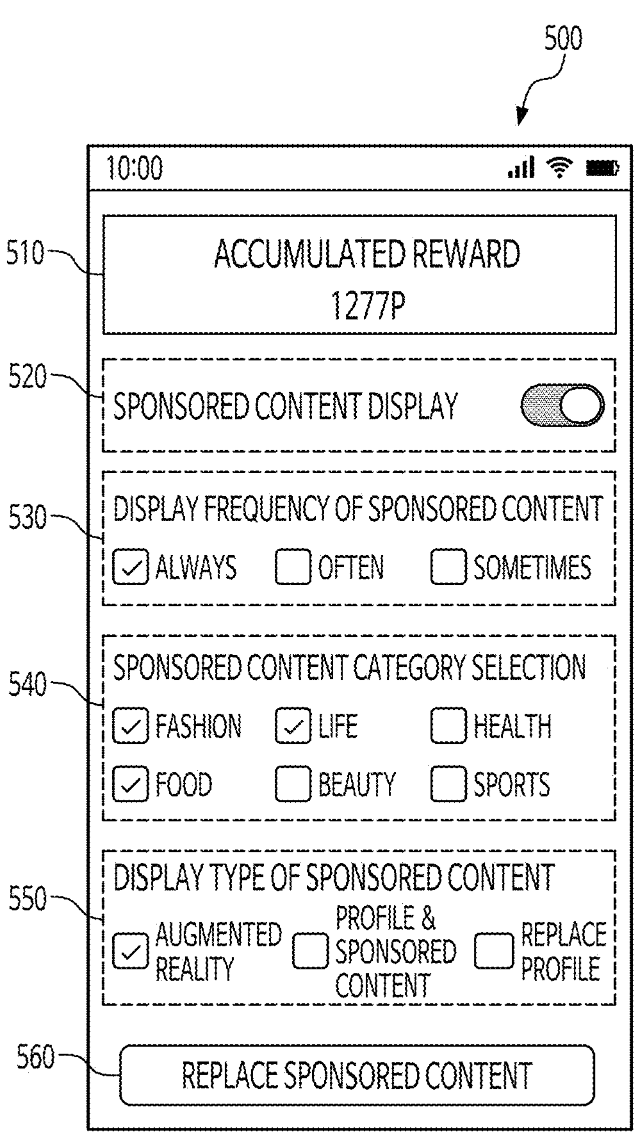
FIG. 5 is a diagram illustrating a sponsored content setting screen, according to an example embodiment.

FIG. 5 is a diagram illustrating a sponsored content setting screen 500. The sponsored content setting screen 500 may include, but is not limited to, a first area 510 displaying reward information of the user, a second area 520 for selecting whether to display the sponsored content on the profile area, a third area 530 for selecting the display frequency of sponsored content, a fourth area 540 for selecting the category of sponsored content, a fifth area 550 for selecting the display type of sponsored content, and a button 560 for selecting whether to replace the sponsored content.

The reward information of the user may be displayed in the first area 510. The reward information may be displayed in various formats and units according to the type of the reward. The reward information may include remaining reward information currently held by the user, reward information accumulated to date, and/or reward information accumulated over a specific period. Additionally, the reward information may include basic information for calculating the reward, such as the total number of exposures, the total number of clicks on the sponsored content, etc.

In the second area 520, whether to display the sponsored content on the profile area may be selected. The second area 520 may include a toggle button, a checkbox, etc. configured to select whether to display the sponsored content.

The display frequency of sponsored content may be selected in the third area 530. FIG. 5 illustrates that the display frequency of sponsored content is categorized as "Always", "Often", and "Sometimes", but aspects are not limited thereto. For example, the third area 530 may be configured to allow a user to specifically select the display frequency or time of sponsored content within a set period.

The category of sponsored content may be selected in the fourth area 540. The category of sponsored content may refer to the type or classification item (e.g., class) of the target product or target service of the sponsored content. For example, the category of sponsored content may include fashion, life, health, finance, news media, beauty, real estate, government agencies, sports, groceries, travel, art, etc., but is not limited thereto. A multi-selection checkbox configured to allow the selection of at least one or more categories from a plurality of categories may be displayed in the fourth area 540.

The display type of at least one piece of sponsored content may be selected in the fifth area 550. FIG. 5 illustrates that the display type of sponsored content is categorized as "Augmented Reality", "Profile & Sponsored Content", and "Profile Replacement", but aspects are not limited thereto, and may be configured to allow the selection of various display types.

If "Augmented Reality" is selected as the display type, the sponsored content may be displayed in combination with the profile image of the user through the augmented reality technique. In another aspect, if "Profile & Sponsored Content" is selected, the profile image of the user and the sponsored content may be displayed together on the profile area. For example, a layer displaying the sponsored content may correspond to an upper layer compared to a layer displaying the profile image of the user. In another aspect, if "Profile Replacement" is selected, instead of displaying the profile image of the user on the profile area, the sponsored content may be displayed in place of the profile image.

Although not illustrated, an automatically selectable option by the processor 334 of the information processing system may be provided as the display type of the sponsored content. If the automatically selectable option is selected, the processor 334 may determine the display type by at least one of the category or content of sponsored content, the profile image of the user set by the user, user-associated information, chat content in the chat room, or information associated with other participants in the chat room.

Some of the display types may be deactivated according to the category selected in the fourth area 540. For example, if there is no sponsored content of the augmented reality type among the sponsored content in the health category, the "Augmented Reality" item may be deactivated. Conversely, some of the categories of the fourth area 540 may be deactivated according to the display type selected in the fifth area 550.

Upon clicking the button 560, the sponsored content displayed in the profile area may be replaced. Although the button 560 is illustrated in FIG. 5, aspects are not limited thereto, and alternatively, any icon, input window, etc. that can receive a selection to replace the sponsored content may be displayed on the setting screen 500.

If it is selected to replace the sponsored content (e.g., if the button 560 is clicked), a pop-up screen, etc. for generating or selecting a reason for replacement may be displayed. In this case, sponsored content different from the existing sponsored content may be displayed in the profile area in place of the existing sponsored content based on the replacement reason.

Each of the areas 510, 520, 530, 540, and 550 and the button 560 of the setting screen 500 illustrated in FIG. 5 are only examples, and some of these configurations may be omitted, or their positions, sizes, or components may be configured differently from those illustrated in FIG. 5. For example, if it is selected in the second area 520 not to display the sponsored content on the profile area of the user (e.g., if the second area 520 is deactivated), the third to fifth areas 530, 540, and 550 and the button 560 may be omitted.

Figure 6:
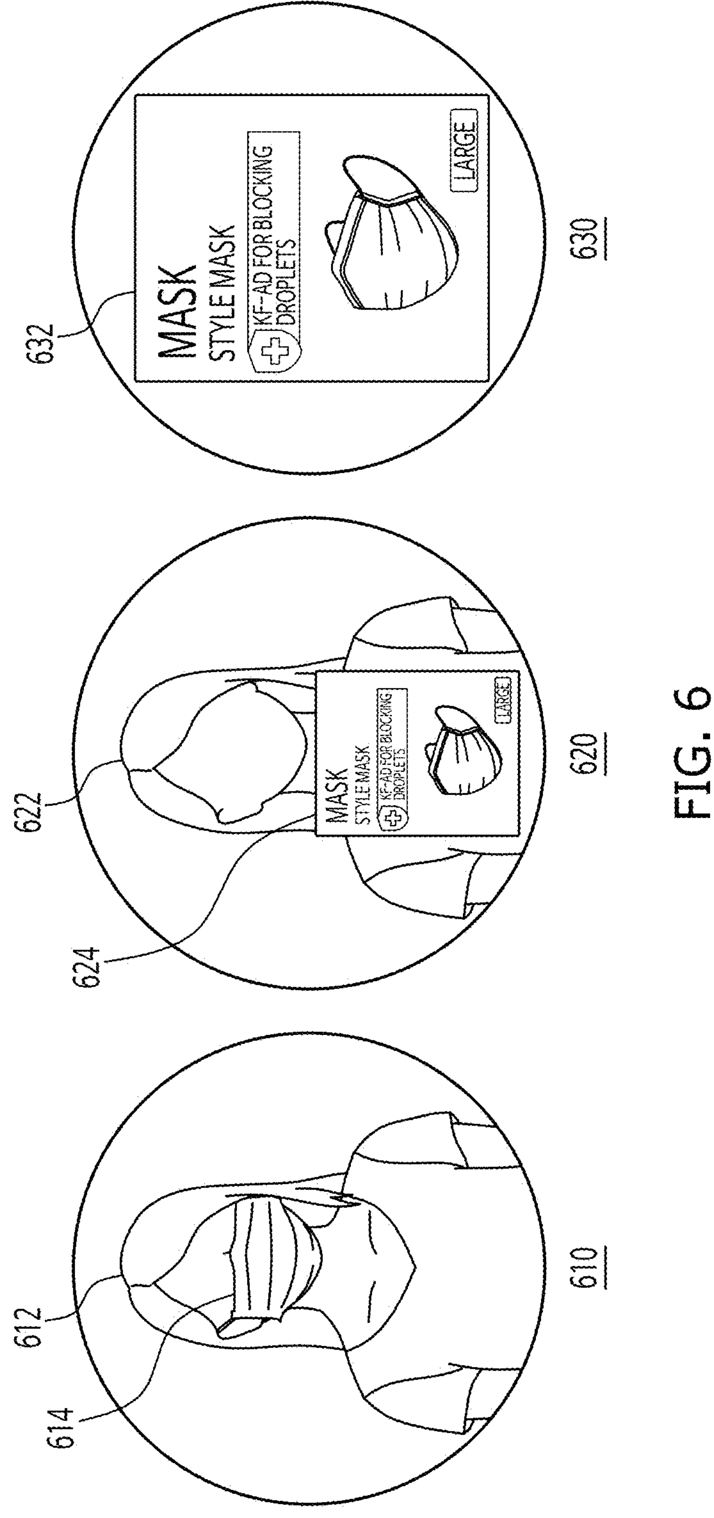
FIG. 6 is a diagram illustrating an example of displaying sponsored content in a profile area based on a display type of sponsored content, according to an example embodiment.

FIG. 6 is a diagram illustrating an example of displaying sponsored content 614, 624, and 632 in profile areas 610, 620, and 630 based on the display type of the sponsored content.

A profile image 612 of the user in the profile area 610 may be displayed in combination with the sponsored content 614 through an augmented reality technique. For example, the sponsored content 614 may be an image associated with a face mask, and may be displayed in combination with the profile image 612 of the user in the profile area 610 to show the user wearing the mask. In another example, the user may be displayed as wearing a hat which is the target product of the sponsored content, or may be displayed as having lipstick which is the target product. With such a configuration, sponsored content that stimulates purchase desire may be provided.

In another aspect, a profile image 622 and the sponsored content 624 may be displayed together in the profile area 620. In this case, a layer displaying the sponsored content 624 may be an upper layer compared to a layer displaying the profile image 622. In another aspect, the sponsored content 632 may be displayed in place of the profile image of the user in the profile area 630.

Figure 7:
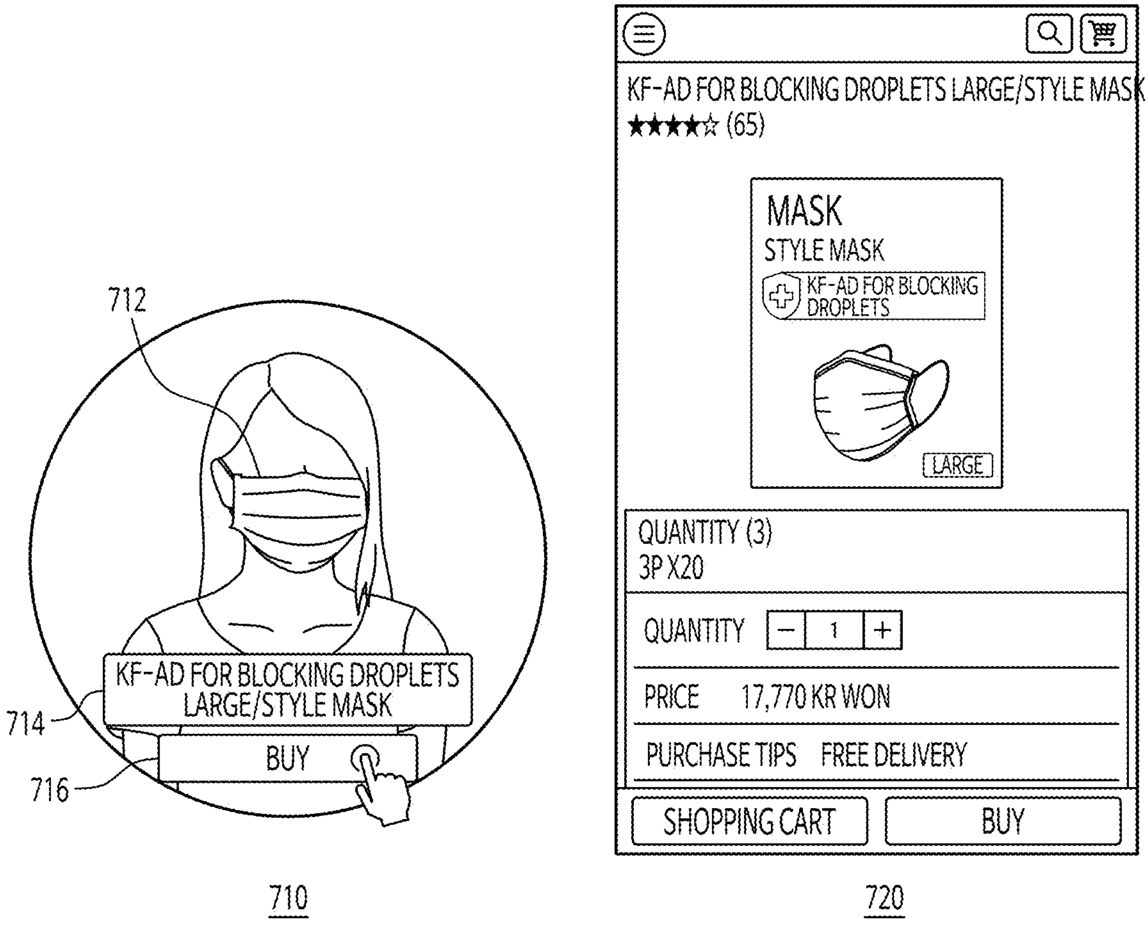
FIG. 7 is a diagram illustrating a profile area and a purchase page for a target product of sponsored content, according to an example embodiment.

FIG. 7 is a diagram illustrating a profile area 710 and a purchase page 720 of a target product of the sponsored content. An image 712 associated with the sponsored content, information 714 associated with a target product of the sponsored content, and/or a link 716 associated with the sponsored content may be displayed in the profile area 710. In this case, the link 716 may refer to a hyperlink that allows users to navigate to the purchase page 720, or a shape, an icon, etc. linked to the purchase page 720.

The information 714 associated with the target product may include a target product name, a price of the target product, at least a part of the title of the purchase page 720, a name of sales platform, etc., but is not limited thereto.

In response to clicking on the image 712 or the link 716 associated with the sponsored content, the purchase page 720 may be displayed on the screen. In some example, in response to clicking the link 716, payment for the target product may be processed immediately.

Figure 8:
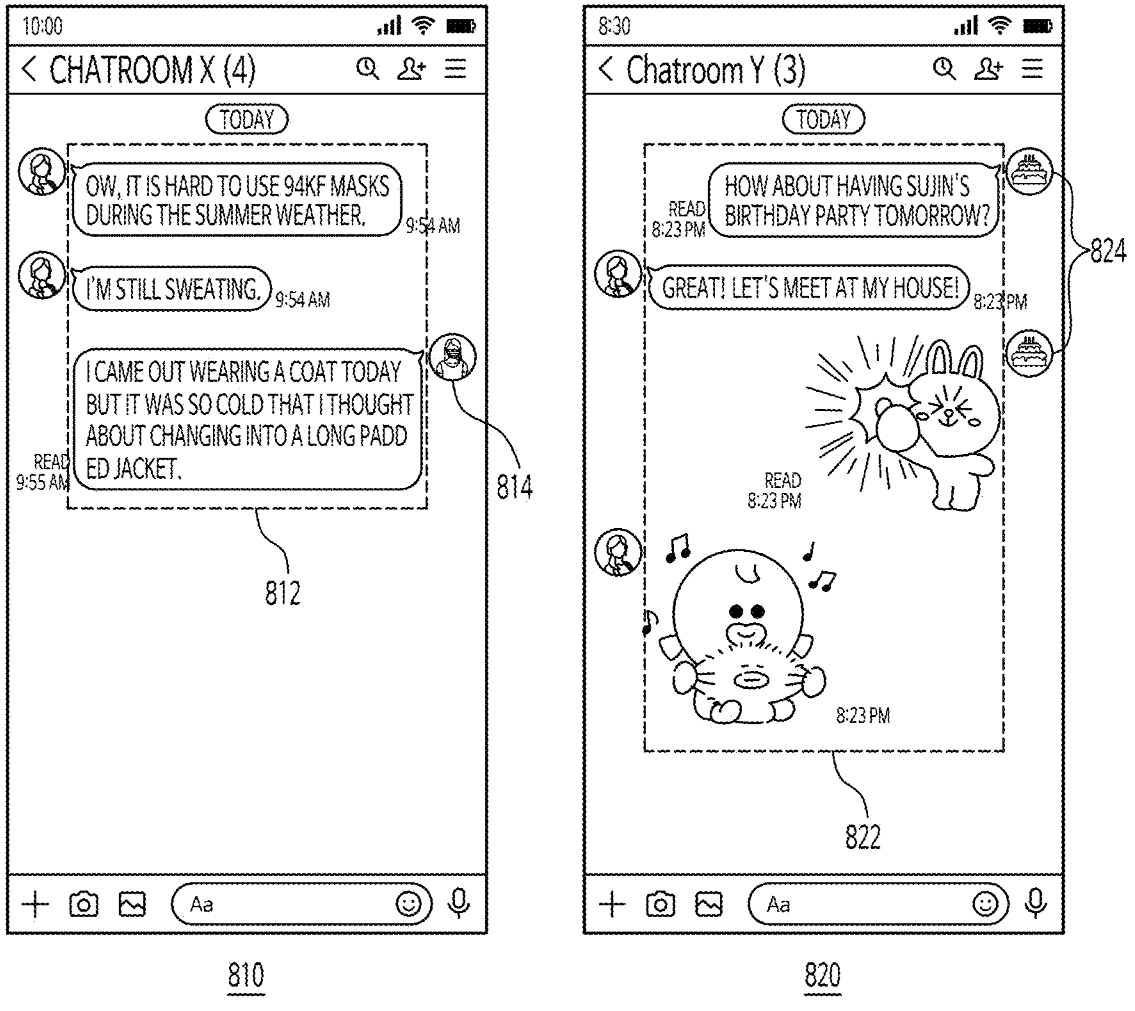
FIG. 8 is a diagram illustrating an example of displaying a profile area, according to an example embodiment.

FIG. 8 is a diagram illustrating an example of displaying profile areas 814 and 824.

A first screen 810 is a screen showing a first chat room in which the user is participating. The profile area 814 displayed in the first chat room may be exposed to the participants of the first chat room. In this case, the sponsored content may be selected based on chat content 812 of the first chat room. For example, if the chat content 812 includes a chat associated with a face mask, the same sponsored content associated with the face mask may be displayed in the profile area 814 to the participants of the first chat room.

A second screen 820 is a screen showing a second chat room different from the first chat room in which the same user is participating. The profile area 824 displayed in the second chat room may be exposed to the participants of the second chat room. In this case, the sponsored content may be selected based on chat content 822 of the second chat room and different from the sponsored content (e.g., face mask) of the first chat room. For example, if the chat content 822 includes a chat associated with birthdays, the same sponsored content associated with cakes may be displayed in the profile area 824 to the participants of the second chat room.

Furthermore, the sponsored content displayed in the profile area may be exposed differently to each participant of the chat room according to their expected levels of interest. For example, if the sponsored content is determined based on the expected level of interest of each participant, in the second chat room, sponsored content related to whipped cream cakes may be displayed in the profile area 824 for participant 1, and sponsored content related to carrot cakes may be displayed in the profile area 824 for participant 2. In an aspect illustrated in FIG. 8, the profile areas 814 and 824 of the user are displayed on the screens 810 and 820 in the chat room, respectively, but aspects are not limited thereto. In another aspect, the profile areas 814 and 824 may not be displayed on the screens 810 and 820 of the user terminal, but may be displayed only on the screens of the participants (e.g., the chat partners) of each chat room.

Figure 9:
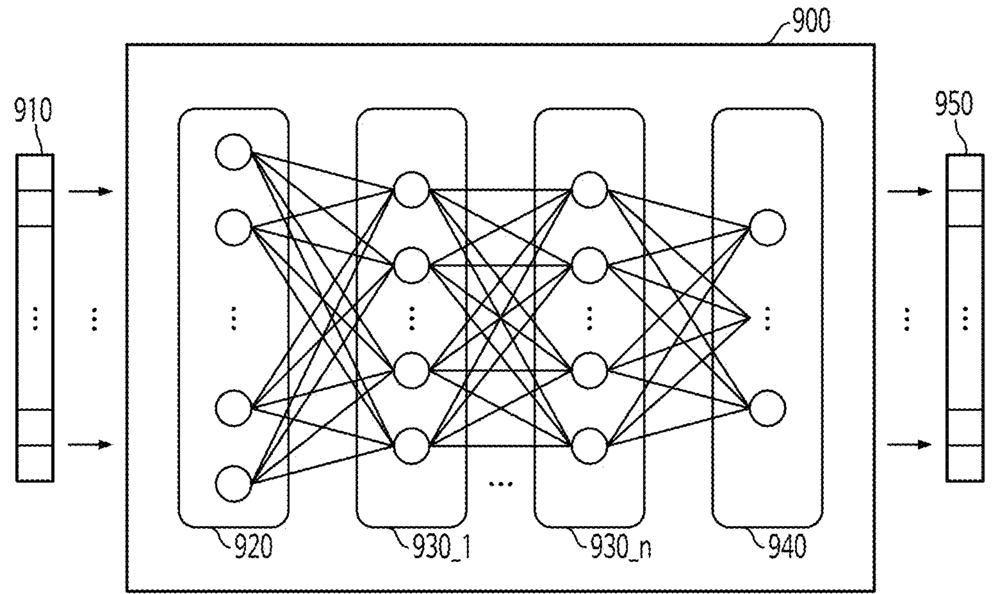
FIG. 9 is a diagram illustrating an example of an artificial neural network model, according to an example embodiment.

FIG. 9 is an example diagram illustrating an artificial neural network model 900. In machine learning technology and cognitive science, the artificial neural network model 900, as an example of a machine learning model, refers to a statistical learning algorithm implemented based on biological neural network structure or a structure that executes such an algorithm.

As in the biological neural networks, the artificial neural network model 900 may represent a machine learning model that acquires a problem solving ability by repeatedly adjusting the weights of synapses by the nodes, which are artificial neurons forming the network through synaptic combinations, thus training to reduce errors between a target output corresponding to a specific input and a deduced output. For example, the artificial neural network model 900 may include any probability model, neural network model, etc., that is used in artificial intelligence learning methods such as machine learning and deep learning.

The model for calculating expected level of interest described above may be generated in the form of the artificial neural network model 900. For example, the artificial neural network model 900 may receive at least one of the information associated with a user, the information associated with other participants in the chat room, or the chat content in the chat room, and extract the expected level of interest for the sponsored content candidate.

The artificial neural network model 900 is implemented as a multilayer perceptron (MLP) formed of multilayer nodes and connections therebetween. The artificial neural network model 900 may be implemented using one of various artificial neural network model structures including the MLP. As illustrated in FIG. 4, the artificial neural network model 900 includes an input layer 920 to receive an input signal or data 910 from the outside, an output layer 940 to output an output signal or data 950 corresponding to the input data, and (n) number of hidden layers 930_1 to **930_*n* (where n is a positive integer) positioned between the input layer 920 and the output layer 940 to receive a signal from the input layer 920, extract the features, and transmit the features to the output layer 940. In an example, the output layer 940 receives signals from the hidden layers 930_1 to 930_*n*** and outputs the signals to the outside.

The method for training the artificial neural network model 900 includes the supervised learning that trains the artificial neural network model 900 to be optimized or improved for solving a problem with inputs of teacher signals (correct answers), and the unsupervised learning that does not need a teacher signal. The information processing system may train the artificial neural network model 900 using at least one of the information associated with the user, the information associated with other participants in the chat room, or the chat content in the chat room.

The information processing system may directly generate the training data for training the artificial neural network model 900. For example, the information processing system may generate a training data set that includes at least one of the information associated with the user, the information associated with other participants in the chat room, or the chat content in the chat room. The information processing system may train the artificial neural network model 900 for calculating the expected level of interest based on the generated training data set.

The input variable of the artificial neural network model 900 may include at least one of the chat content or the personal information. If the input variable described above is input through the input layer 920, the output variable output from the output layer 940 of the artificial neural network model 900 may be information associated with the expected level of interest of each sponsored content candidate.

As described above, the input layer 920 and the output layer 940 of the artificial neural network model 900 are matched with a plurality of output variables corresponding to a plurality of input variables, respectively, and as the synaptic values between nodes included in the input layer 920, the hidden layers 930_1 to **930_*n*, and the output layer 940 are adjusted, training can be processed to extract a correct output corresponding to a specific input. Through this training process, the features hidden in the input variables of the artificial neural network model 900 can be confirmed, and the synaptic values (or weights) between the nodes of the artificial neural network model 900** can be adjusted so that errors between the target output and the output variable calculated based on the input variable are reduced. In addition, the information processing system may learn an algorithm that takes as input at least one of the information associated with the user, the information associated with other participants in the chat room, or the chat content in the chat room, and may learn in a way that reduces or minimizes the loss with respect to information (e.g., annotation information) associated with the expected level of interest for each sponsored content candidate.

By using the artificial neural network model 900 trained in this way, information associated with the expected level of interest of each sponsored content candidate may be extracted.

Figure 10:
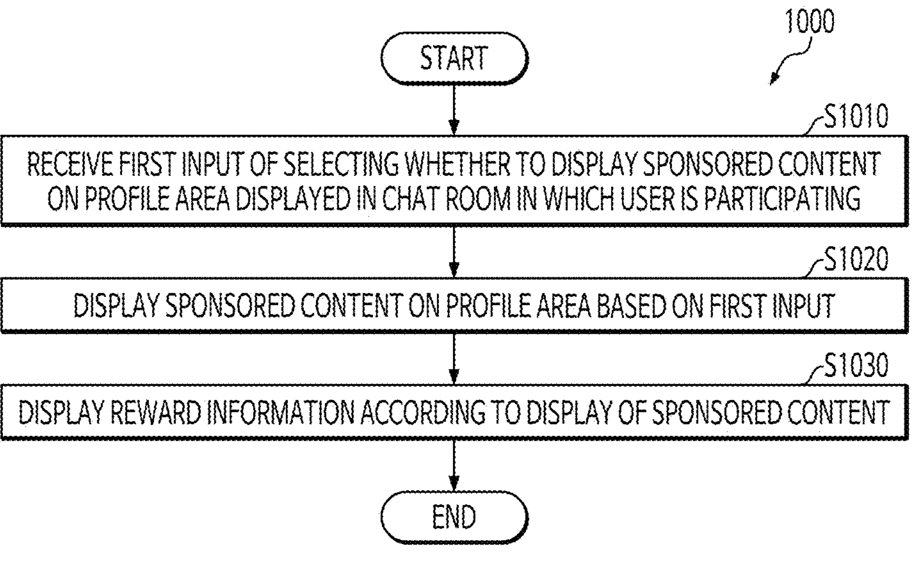
FIG. 10 is a flowchart provided to explain a method for displaying sponsored content, according to an example embodiment.

FIG. 10 is a flowchart provided to explain a method 1000 for displaying sponsored content. The method 1000 for displaying sponsored content may be performed by a processor (e.g., at least one processor of the user terminal). The method 1000 for displaying sponsored content may be initiated by the processor receiving the first input of selecting whether to display sponsored content on the profile area, at S1010.

The processor may display the sponsored content on the profile area based on the first input, at S1020. Additionally, the processor may further receive the second input of selecting the display frequency of sponsored content and display the sponsored content on the profile area based on at least one of the first and second inputs. Additionally, the processor may further receive the third input of selecting the category of sponsored content and display the sponsored content on the profile area based on at least one of the first to third inputs. Additionally, the processor may further receive the fourth input of selecting the display type of sponsored content and display the sponsored content on the profile area based on at least one of the first to fourth inputs.

The processor may display the sponsored content in the profile area based on at least one of the information associated with the user, the information associated with other participants in the chat room, or the chat content in the chat room. In another aspect, the processor may display, among a plurality of sponsored content candidates, a sponsored content candidate with the highest expected level of interest as the sponsored content in the profile area. In this case, the expected level of interest may be calculated according to the machine learning model based on at least one of the chat content or the personal information.

The processor may display the sponsored content in combination with the profile image of the user through the augmented reality technique. The sponsored content may be displayed together with the profile image of the user, or the sponsored content may be displayed in place of the profile image of the user. In this case, the layer displaying the sponsored content may correspond to an upper layer compared to the layer displaying the profile image of the user.

The processor may display the information associated with the target product of the sponsored content in the profile area. In another aspect, the processor may display a link associated with the sponsored content in the profile area and, in response to clicking the link, display a purchase page of the target product of the sponsored content. In another aspect, the processor may display an image associated with the sponsored content in the profile area and, in response to clicking the image associated with the sponsored content, display the purchase page of the target product of the sponsored content.

The processor may display different sponsored content in the profile area according to the chat room in which the user is participating.

The processor may further receive the fifth input for replacing sponsored content, and display sponsored content, which is different from the sponsored content, in place of the sponsored content in the profile area based on at least one of the first to fifth inputs.

The processor may display the reward information according to the display of the sponsored content, at S1030. The reward may be calculated based on the selected display frequency of sponsored content. The reward may be calculated based on the total number of exposures or the total number of clicks on the sponsored content.

The method described above may be provided as a computer program stored in a computer-readable recording medium for execution on a computer. The medium may be a type of medium that continuously stores a program executable by a computer or temporarily stores the program for execution or download. In addition, the medium may be a variety of writing means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies according to design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, and/or any other combination of the configurations.

Integrating sponsored content directly into the user's profile area within a chat room according to certain example embodiments of the present disclosure can present technical challenges, including the need to maintain rendering quality, accommodate varied device and network conditions, and/or protect user privacy while ensuring real-time responsiveness.

In response to these challenges, a system may be configured to employ a multi-layer architecture that separates the user's profile image layer from a sponsored content layer and recalculates coordinate positions whenever either one of the user's profile image layer and the sponsored content layer changes, thereby avoiding any misalignment or occlusion and/or ensuring consistent display.

Some example implementations of the present disclosure may employ adaptive streaming techniques to address heterogeneous network conditions, allowing the system to dynamically adjust the bitrate or resolution of sponsored content according to available bandwidth, which helps preserve display quality across various user terminals such as smartphones, tablets, and personal computers.

To further optimize real-time performance, caching mechanisms may be used at both server and client endpoints to reduce redundant data transfers and/or network load, especially when users frequently update profile images or switch between multiple chat rooms.

In some example embodiments, enhanced privacy modules may encrypt or anonymize user data and store only aggregated information to allow the system to deliver targeted advertising based on demographic insights or chat-derived interests without exposing personally identifiable information.

For context-driven content selection, a rules-based filtering engine may operate alongside other components to screen out irrelevant sponsored material, and may be further refined by machine learning techniques that account for chat keywords, user preferences, and/or time-of-day factors in selecting high-relevance ads.

In some example embodiments, the system may incorporate a neural network model that calculates an expected level of interest for each sponsored content candidate by processing user attributes, chat logs, and/or historical click-through data, with multiple hidden layers to extract complex correlations among input variables.

Training the neural network model may be performed offline, using large batches of historical data to establish baseline weights, and/or may be performed incrementally, by incorporating ongoing user interactions and purchase data that enable the model to adapt to evolving preferences in near-real-time.

Upon completion of training, the model may be deployed on a server or cloud environment, where a user terminal can send relevant context through an API call, receive a ranked list of sponsored content candidates, and/or display the top-scoring item in the user's profile area without overburdening client-side hardware.

By implementing these technical features collectively, including the resolution of overlay challenges, adaptive streaming, data security measures, and/or advanced machine learning-based ranking, some example embodiments of the present disclosure may deliver user-customized sponsored content within the profile area while maintaining efficient operation of the chat application.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, etc. The commands may be executable by one or more processors, and may cause the processor(s) to perform certain aspects of the functions described in the present disclosure.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable apparatus.

Although the present disclosure has been described herein in connection with some aspects, various modifications and changes can be made without departing from the scope of the present disclosure, which can be understood by those skilled in the art to which the present disclosure pertains. In addition, such modifications and changes should be considered within the scope of the claims appended herein.

What is claimed is:

1. A method for displaying sponsored content on a profile area of a user displayed in a chat room of a messaging application, in which the user is participating, the method being executed by one or more processors of a user terminal and comprising:

training a machine learning model using a training data set that includes at least one of first information associated with the user, second information associated with other participants in the chat room, or chat content in the chat room;

calculating a plurality of expected levels of interest corresponding to a plurality of sponsored content candidates, respectively, using the trained machine learning model;

selecting, among the plurality of sponsored content candidates, a sponsored content candidate with a highest expected level of interest as the sponsored content;

receiving a first input of selecting whether to display the sponsored content on the profile area in the chat room;

displaying the sponsored content in combination with a profile image of the user in the profile area, using an augmented reality (AR) technique; and displaying reward information corresponding to a degree to which the sponsored content is displayed in the profile area, through a user interface of the messaging application.

2. The method according to claim 1, further comprising:

receiving a second input of selecting a display frequency of the sponsored content, wherein the displaying the sponsored content in the profile area includes displaying the sponsored content in the profile area based on the second input.

3. The method according to claim 1, further comprising:

receiving a second input of selecting a category of the sponsored content, wherein the displaying the sponsored content in the profile area includes displaying the sponsored content in the profile area based on the second input.

4. The method according to claim 1, wherein the displaying the sponsored content in the profile area includes displaying the sponsored content in the profile area based on the first information associated with the user.

5. The method according to claim 1, wherein the displaying the sponsored content in the profile area includes displaying the sponsored content in the profile area based on the second information associated with another participant in the chat room.

6. The method according to claim 1, wherein the displaying the sponsored content in the profile area includes displaying the sponsored content in the profile area based on the chat content in the chat room.

7. The method according to claim 1, wherein a first layer displaying the sponsored content corresponds to an upper layer compared to a second layer displaying the profile image of the user.

8. The method according to claim 1, further comprising:

receiving a second input of selecting a display type of the sponsored content, wherein the displaying the sponsored content in the profile area includes displaying the sponsored content in the profile area based on the second input.

9. The method according to claim 1, wherein the displaying the sponsored content in the profile area includes displaying, in the profile area, information associated with a target product of the sponsored content.

10. The method according to claim 1, further comprising:

displaying a link associated with the sponsored content in the profile area; and in response to clicking the link, displaying a purchase page of a target product of the sponsored content.

11. The method according to claim 1, further comprising:

displaying an image associated with the sponsored content in the profile area; and in response to clicking on the image associated with the sponsored content, displaying a purchase page of a target product of the sponsored content.

12. The method according to claim 1, wherein the chat room includes a first chat room and a second chat room different from the first chat room, and the displaying the sponsored content in the profile area includes displaying different sponsored content in the profile area according to the chat room, in which the user is participating, being the first chat room or the second chat room.

13. The method according to claim 1, further comprising:

receiving a second input for replacing the sponsored content; and displaying, based on the second input, another sponsored content different from the sponsored content in the profile area in place of the sponsored content.

14. The method according to claim 2, further comprising:

calculating the reward information based on the display frequency of the sponsored content on the profile area.

15. The method according to claim 1, further comprising:

calculating the reward information based on a total number of exposures of the sponsored content on the profile area or a total number of clicks on the sponsored content associated with the profile area.

16. A non-transitory computer-readable recording medium storing instructions that, when executed by one or more processors, cause a user terminal to perform the method according to claim 1.

17. An information processing system, comprising:

a memory; and one or more processors connected to the memory and configured to execute one or more computer-readable programs included in the memory, wherein the one or more computer-readable programs include instructions for training a machine learning model using a training data set that includes at least one of first information associated with a user of a messaging application, second information associated with other participants in a chat room, in which the user is participating, or chat content in the chat room, calculating a plurality of expected levels of interest corresponding to a plurality of sponsored content candidates, respectively, using the trained machine learning model, selecting, among the plurality of sponsored content candidates, a sponsored content candidate with a highest expected level of interest as sponsored content, receiving a first input of selecting whether to display the sponsored content on a profile area of the user displayed in the chat room, displaying the sponsored content in combination with a profile image of the user in the profile area, using an augmented reality (AR) technique, and calculating and displaying reward information corresponding to a degree to which the sponsored content is displayed in the profile area, through a user interface of the messaging application.

* * * * *